3,180,747
PROTECTIVE COATING

Robert H. Patton, Baytown, and James B. Cox, Pasadena, Tex., assignors, by mesne assignments, to Esso Research and Engineering Company, Elizabeth, N.J., a corporation of Delaware
No Drawing. Filed Aug. 3, 1961, Ser. No. 128,964
10 Claims. (Cl. 106—74)

The present invention is directed to a single-application inorganic coating. More particularly, the invention is concerned with a liquid treating composition comprising a lithium silicate solution. In its more specific aspects, the invention is concerned with the application of this lithium silicate solution used alone or with specific additives to numerous materials as a protective, bonding, and fire-resistant coating.

The present invention may be briefly described as a single-application liquid coating composition, which comprises an aqueous solution of a lithium silicate, the lithium silicate being formed to provide a ratio of lithium oxide to silicon dioxide of about 1.00: about 2.0 to about 6.3, respectively. In its more specific aspects, the invention is concerned with the addition of certain additives to the lithium silicate solution to provide specially adapted coating materials.

The lithium silicate solution of the present invention has been found to have numerous uses when used alone or when additives are combined with the solution. The solution of the present invention when used alone may be applied by brush, spray or dipping to materials, such as paper or fabric, and renders these materials nonflammable and moisture resistant. Materials which are rigid can be sealed against the passage of moisture and made fireproof by the solution of the present invention. Also, the solution of the present invention can be colored with stable dyes to impart desirable colors.

The solution of the present invention is capable of protecting wood against rot, fire, water absorption, and may be effective against termites and wood borers. Further, the solution of the present invention is capable of bonding, waterproofing and general strengthening of glass matting, asbestos, paper, cloth and similar materials. The solution may be sprayed, brushed, rolled or mopped, on surfaces such as insulation, paper, cardboard and similar materials or generally a surface of such a nature which may be impregnated with the solution. Still further, the solution of the present invention has been found to be a new and useful surface bonding, adhesive and cementing agent.

The present invention is also concerned with a method of preparing the lithium silicate solution in which lithium hydroxide which is preferably the monohydrate since it is easier to use and gives an improved coating and silica-containing materials such as silicic acid and silica gel are added to water while agitating same, following which the admixture is heated while continuing the agitation thereof to a temperature within the range from about 75° to about 150° C. for a sufficient length of time to form the lithium silicate admixture. The lithium hydroxide and silica gel are used in amounts sufficient to provide a ratio of lithium oxide to silicon dioxide of about 1.00: about 2.0 to about 6.3, respectively, following which the admixture is cooled to a temperature within the range from about 20° to about 30° C. at which temperature any solids go into solution and form an aqueous solution thereof.

The invention will be further illustrated by the following specific examples, which are given by way of illustration and not as limitations on the scope of the invention.

One aspect of the present invention is the making and use of the lithium silicate solution without the addition of any additive materials. A composition in accordance with this aspect of the invention was made up in the following manner:

Example I

Water, silica gel, and lithium hydroxide are charged into a stainless steel pressure vessel equipped with an agitator. During the initial mixing of these ingredients, evolution of heat raises the temperature of the contents to 50° to 55° C. The reactor is then sealed and the temperature of the reactants, under continued agitation, is raised to 150° C. over a period of time, which may vary from 30 to 90 minutes. After the vessel reaches about 150° C. and about 70 p.s.i. of pressure, the contents are slowly cooled at a rate of about 0.61° C. to about 1.83° C. per minute. This will result in a temperature drop from about 150° C. to about 95° C. within about 30 to about 90 minutes. This completes the initial part of the reaction which forms the solid lithium silicate.

The second part of the operation (below 95° C.) requires a longer period of time in order to effectively dissolve the solid silicate at lower temperatures. The reduction of the temperature of the reactor contents from 95° C. to 40° C. at a rate of about 0.37° C. to about 0.146° C. per minute should be accomplished within 150 minutes to 240 minutes. The last temperature drop from 40° C. to 25° C. may be conducted over a period of 60 to 120 minutes at a cooling rate of about 0.25° C. to about 0.125° C. per minute.

Depending upon the amount of water used, the solution may be used in different solid ratios, i.e., the total solids of the solution may vary from about 10% to 45% by weight.

At this point, it should be emphasized that compositions made up simply by mixing the several ingredients at ambient temperatures with stirring do not produce satisfactory coating compositions.

Example II

A solution was prepared in a manner similarly as described in Example I, except that it was made from the following ingredients:

| | Grams |
|---|---|
| Lithium hydroxide monohydrate | 84 |
| Silica gel | 300 |
| Water | 1152 |

These ingredients are placed in a stainless steel pressure vessel, and; under continual agitation, the temperature is raised to 150° C. The temperature is then slowly reduced to 25° C. over a period of 8 hours similarly as in Example I.

The resulting composition can be described at 1 $Li_2O$ to 5.0 $SiO_2$ aqueous solution having a total solids content of about 25%.

This solution was used to saturate cotton fabric and paper. Upon drying by water evaporation, these materials were rigid and fireproof when exposed to an open flame from a Fisher burner. Neither the paper nor the fabric was moistened after being exposed at 100% relative humidity and 40° C. for 72 hours.

From the foregoing example, it can be seen that the resulting lithium silicate composition of the present invention is moisture resistant and fireproof when applied by brush, spray or dipping to paper, fabric, cardboard, wallboard and similar materials. The solution of the present invention is especially effective in impregnating these types of materials when prepared having a total solid content of between about 10% and about 35% by weight for the foregoing purposes.

The solution of the present invention may be used to protect wood when the total solids of the solution varies from about 10% to about 35% by weight is shown by the following example:

*Example III*

The solution of Example II (500 grams) and water (100 grams) are mixed in a container. Three types of wood (pine, oak, fir) are immersed for 30 minutes under constant vacuum. The wooden panels are removed and dried thoroughly, then subjected to an open flame. The wood is charred, but at no time does it burn. A microscopic examination reveals that approximately 60% of the voids in the wood are occupied by silica.

The solution of the present invention is nonflammable, odorless and nontoxic. The solution may be applied to wood by brush, spray, dip, mop, under pressure or vacuum, and protects the wood against rot, fire, water absorption, termites, etc.

The solution of the present invention, other than being applied as a film coating, may be applied by mixing the lithium silicate solution in a matrix such as glass fibers, asbestos, paper fibers and similar materials and applied to a material as a protective coating directly by trowel. When mixed in a matrix of material, the solution of the present invention has a solid content of about 20% to about 30% by weight. The nonflammable, odorless, nontoxic solution of the present invention is completely water insoluble when cured and is unaffected by most chemicals with the exception of hydrogen fluoride and strong concentrated alkalies. When incorporated in the matrix of material, it has been found to be an effective binding agent, which makes a more compact insulating or protecting material. The solution of the present invention which impregnates a material is effective to waterproof the material and makes it fireproof. When incorporating the solution of the present invention into a glass matting or asbestos, it protects these materials from weather when they are used out-of-doors. When incorporated in paper fibers or cardboard, the solution of the present invention enables the same to be exposed to weather and to water as well as generally strengthening the material without any visible signs of deterioration.

Surprisingly, it has been found that the solution of the present invention, either used alone or in admixture with various additives, is an effective bonding, adhesive, and cementing agent. In this respect, the solution of the present invention is useful in bonding of two or more surfaces to produce a strong water resistant bond. In particular, the solution may be used in a large variety of surfaces such as: wood, paper, cardboard, cloth, plastics, glass, metals, concrete, brick, etc. The solution of the present invention is, therefore, useful in the manufacture of items such as: corrugated paper boxes, ply wood, laminated fiber board, plastics, wall board, insulating board, sound-absorbing wall covering, spirally wound constructions, laminated mica, refractory cements, grinding wheel abrasive surfaces, granular roof surface construction material, cement mortar, acid resistant cements, etc.

The bonding adhesive and cementing characteristics of the present invention may be improved by the addition of additives, such as casein, clay, sugars, aluminates, asbestos, organic materials, etc., as well as potassium chloride, potassium bromide, borax, etc., to improve the curing of the present invention. These additives are added in amounts between about 5% and 85% by weight, the fillers being used in an amount between about 5% and about 85% by weight and the curing agent in about 0.01% to about 3.0% by weight of the mixed composition. A preferred adhesive agent is adding to the lithium silicate solution of the present invention about 20% by weight of clay as a filler and about 0.1% of borax as a curing agent.

The nature and objects of the present invention having been completely described and illustrated and the best mode thereof set forth, what we wish to claim as new and useful and secure by Letters Patent is:

1. A method for preparing a lithium silicate solution comprising admixing lithium hydroxide, a silica-containing material selected from the group consisting of silica gel and silicic acid, and water, while agitating same; heating said admixture while continuing the agitation thereof to a temperature within the range from about 75° to about 150° C. for a sufficient length of time to form said lithium silicate; said lithium hydroxide and silica-containing material being employed in an amount sufficient to provide a ratio of lithium oxide to silicon dioxide within the range of about 1.00 $Li_2O$:about 2.0 to about 6.3 $SiO_2$ and a total solids from about 10 percent to 45 percent by weight; and cooling said admixture to a temperature within the range from 20° to about 30° C. to form an aqueous solution thereof.

2. A composition of matter consisting essentially of an aqueous solution of lithium silicate made by the method of claim 1.

3. Wood impregnated with the composition of matter of claim 2.

4. Glass matting impregnated with the composition of matter of claim 2.

5. Insulation material impregnated with the composition of matter of claim 2.

6. Paper impregnated with the composition of matter of claim 2.

7. Cardboard impregnated with the composition of matter of claim 2.

8. An adhesive composition comprising an aqueous solution of lithium silicate made by the method of claim 1; a filler material present in an amount between 5.0 percent and 85 percent by weight; and a curing agent present in the amount between 0.01 percent and 3.0 percent by weight.

9. An adhesive composition of claim 8 wherein the filler material consists of 20 percent by weight of clay and the curing agent consists of 0.10 percent by weight of borax.

10. A method for preparing a lithium silicate solution comprising admixing lithium hydroxide, a silica-containing material selected from the group consisting of silica gel and silicic acid, and water, while agitating same; heating said admixture while continuing the agitation thereof to a temperature of about 150° C. for a sufficient length of time to form said lithium silicate; said lithium hydroxide and silica-containing material being employed in an amount sufficient to provide a ratio of lithium oxide to silicon dioxide within the range of about 1.00 $Li_2O$:about 2.0 to about 6.3 $SiO_2$ and a total solids from about 10 percent to about 45 percent by weight; cooling said admixture to a temperature of about 95° C. at a rate within the range of 0.61° C. to about 1.83° C. per minute, and thereafter cooling said admixture at a slower rate to a temperature within the range from about 20° to about 30° to form an aqueous solution thereof.

References Cited by the Examiner

UNITED STATES PATENTS

| | | | |
|---|---|---|---|
| 2,047,614 | 7/36 | Cavezzale | 23—110 |
| 2,881,049 | 4/59 | Erbe et al. | 23—110 |
| 2,914,413 | 11/59 | Mercer | 106—84 |
| 2,965,507 | 12/60 | Lander et al. | 106—84 |
| 2,998,328 | 8/61 | Munger et al. | 106—84 |
| 3,002,857 | 10/61 | Stalego | 106—84 |
| 3,102,038 | 8/63 | Fisher | 106—84 |

(Other references on following page)

OTHER REFERENCES

Mellor: "Comprehensive Treatise on Inorganic and Theoretical Chemistry," published by Longmans, Green and Co., London, 1925, vol. 6, page 329.

Soluble Silicates in Industry, Vail, The Chemical Catalog Company Inc., New York, 1928, page 70.

References Cited by the Applicant
UNITED STATES PATENTS 3,130,061   4/64   McMahon et al.

TOBIAS E. LEVOW, *Primary Examiner.*
JOSEPH REBOLD, *Examiner.*